United States Patent [19]
Hohensee et al.

[11] Patent Number: 5,813,020
[45] Date of Patent: Sep. 22, 1998

[54] METHOD AND SYSTEM FOR DYNAMIC PRESENTATION PARAMETER OVERRIDE DURING DOCUMENT INTERCHANGE

[75] Inventors: Reinhard Heinrich Hohensee, Boulder; James Warden Marlin, Longmont; Jeri Lane Sampson; Jerold Russell Sampson, both of Boulder, all of Colo.

[73] Assignee: International Business Machines Corporation, Armonk, N.Y.

[21] Appl. No.: 509,485

[22] Filed: Jul. 31, 1995

[51] Int. Cl.⁶ ................................................ G06F 7/06
[52] U.S. Cl. ................................................ 707/515
[58] Field of Search .................. 395/144–148, 395/761, 766–769, 788–791; 707/500, 505–508, 526–529, 514–516

[56] References Cited

U.S. PATENT DOCUMENTS

| | | | |
|---|---|---|---|
| 4,881,197 | 11/1989 | Fischer | 707/530 |
| 4,969,093 | 11/1990 | Barker et al. | 707/513 X |
| 5,033,008 | 7/1991 | Barker et al. | 707/523 |
| 5,133,070 | 7/1992 | Barker et al. | 707/513 |
| 5,172,103 | 12/1992 | Kita | 345/127 |
| 5,181,162 | 1/1993 | Smith | 707/530 |
| 5,208,905 | 5/1993 | Takakura et al. | 707/515 |
| 5,231,577 | 7/1993 | Koss | 707/504 |
| 5,291,602 | 3/1994 | Barker et al. | 707/524 |
| 5,375,200 | 12/1994 | Dugan et al. | 707/539 X |
| 5,416,896 | 5/1995 | Motoyama | 707/514 |
| 5,422,992 | 6/1995 | Motoyama et al. | 707/516 |
| 5,446,837 | 8/1995 | Motoyama et al. | 707/514 |
| 5,499,329 | 3/1996 | Motoyama et al. | 707/513 |
| 5,504,891 | 4/1996 | Motoyama et al. | 707/513 |

OTHER PUBLICATIONS

Southerton, Programmer's Gudie to Presentation Manager, pp. 59–89, Aug. 1989.
Pappas et al., Borland C++ Handbook, 1991, pp. 426–427, 1991.
Cooper et al., Oh! Pascal!, 1982, pp. 284–285, 1982.

*Primary Examiner*—Anton Fetting
*Attorney, Agent, or Firm*—Felsman, Bradley, Gunter & Dillon, L.L.P.

[57] ABSTRACT

A method and system for flexibly managing a presentation data stream which includes an ordered stream of uniquely identified data objects and associated elements which specify format and presentation parameters for those data objects for utilization within a specified application. An include object structured field is provided within the data stream which identifies a particular data object and specifies alternate presentation parameters for utilization with that data object. Thereafter, the data object reference within the include object structured field can be presented utilizing the alternate presentation parameters, which override the presentation parameters associated with the referenced data object, obviating any requirement for providing alternate versions of that object for each of multiple diverse applications. In this manner multiple versions of a single data object may be presented utilizing multiple applications or data objects of different architectures may be referenced in an open system and dynamically included in a presentation form document.

19 Claims, 4 Drawing Sheets

| 30 | Structured Field Introducer | | | | |
|---|---|---|---|---|---|
| | SF Length | ID = X'D3AFC3' | Flags | Sequence Number | Structured Field Data |

| 32 | Offset | Type | Name | Range | Meaning | M/O | Exc |
|---|---|---|---|---|---|---|---|
| | 0-7 | CHAR | ObjName | | Name of the object | M | X'06' |
| | 8 | | | | Reserved; must be zero | M | X'06' |
| | 9 | CODE | ObjType | | Object type | M | X'06' |
| | | | | X'5F' | Page Segment | | |
| | | | | X'92' | Other object data | | |
| | | | | X'BB' | Graphics (GOCA) | | |
| | | | | X'EB' | Bar Code (BCOCA) | | |
| | | | | X'FB' | Image (IOCA) | | |
| | 10-12 | UBIN | XoaOset | 0-32767 | X axis origin of the object area | M | X'06' |
| | | | | X'-FFFFFF' | Use the X axis origin defined in the object | | |
| | 13-15 | UBIN | YoaOset | 0-32767 | Y axis origin of the object area | M | X'06' |
| | | | | X'-FFFFFF' | Use the Y axis origin defined in the object | | |
| | 16-17 | CODE | XoaOrent | | The object area's X axis rotation from the X axis of the reference coordinate system. | M | X'06' |
| | | | | X'0000' | 0 degrees | | |
| | | | | X'2D00' | 90 degrees | | |
| | | | | X'5A00' | 180 degrees | | |
| | | | | X'8700' | 270 degrees | | |
| | | | | X'FFFF' | Use the X axis rotation defined in the object | | |
| | 18-19 | CODE | YoaOrent | | The object area's Y axis rotation from the X axis of the reference coordinate system. | M | X'06' |
| | | | | X'0000' | 0 degrees | | |
| | | | | X'2D00' | 90 degrees | | |
| | | | | X'5A00' | 180 degrees | | |
| | | | | X'8700' | 270 degrees | | |
| | | | | X'FFFF' | Use the Y axis rotation defined in the object | | |
| | 20-22 | UBIN | XocaOset | 0-32767 | X axis origin for object content | M | X'06' |
| | | | | X'FFFFFF' | Use the X axis origin defined in the object | | |
| | 23-25 | UBIN | YocaOset | 0-32767 | Y axis origin for object content | M | X'06' |
| | | | | X'FFFFFF' | Use the Y axis origin defined in the object | | |
| | 26 | CODE | RelCSys | | Reference coordinate system | M | X'06' |
| | | | | X'01' | Page or overlay coordinate system | | |
| | 27-n | | Triplets | | Various | M | X'14' |

*FIG. 2*

METHOD AND SYSTEM FOR DYNAMIC PRESENTATION PARAMETER OVERRIDE DURING DOCUMENT INTERCHANGE

BACKGROUND OF THE INVENTION

1. Documents Incorporated by Reference

This invention discloses a method and system for dynamic presentation parameter override during document interchange within the Mixed Object Document Content Architecture (MO:DCA) used within a presentation data stream for document interchange. Background material for an understanding of this invention is incorporated by reference from Mixed Object Document Content Architecture Reference, IBM Publication SC31-6802-03, 1994 and will be referred to herein as Mixed Object Document Content Architecture (MO:DCA).

2. Background of the Invention

The present invention relates in general to an improved method for management of a presentation data stream and in particular to an improved method and system for adapting a presentation data stream for utilization within multiple diverse applications. Still more particularly, the present invention relates to an improved method and system for dynamically overwriting existing presentation parameters for data objects within a presentation data stream. 3. Description of the Related Art:

Presentation architectures are provided for representing documents in a data format which is independent of the methods utilized to capture or create those documents. Documents may contain combinations of text, image, graphics, and/or bar code objects in device and resolution independent formats. Documents may also contain fonts, overlays and other resource objects which are required at presentation time to present the data properly. Additionally, documents may also contain resource objects, such as a document index and tagging elements supporting the search and navigation of document data, for a variety of applciation purposes.

A data stream is a continuous ordered stream of data elements and objects which conform to a given format. Application programs can generate data streams destined for a presentation service, archive library or another application program. The Mixed Object Document Content Architecture (MO:DCA) developed by International Business Machines Corporation of Armonk, New York defines a data stream which may be utilized by applications to describe documents and object envelopes for interchange with other applications and application services. Documents which are defined in the Mixed Object Document Content Architecture (MO:DCA) format may be archived in a database, later retrieved, viewed, annotated and printed in local or distributed system environments. Presentation fidelity is accommodated by including resource objects in the documents that reference those objects.

A mixed object document is a collection of data objects which comprise the document's content and the resources and formatting specifications which dictate the processing functions to be performed on that content. The term "Mixed" in the Mixed Object Document Content Architecture (MO:DCA) refers to both the mixture of data objects and the mixture of document constructs that comprise the document's components. A Mixed Object Document Content Architecture (MO:DCA) can contain a mixture of presentation data objects. Each data object type has a unique processing requirement.

The Mixed Object Document Content Architecture (MO:DCA) is designed to facilitate document interchange as well as document exchange. Interchange is the predictable interpretation of shared information in an environment where the characteristics of each process need not be known to all other processes. Exchange is the predictable interpretation of shared information by a family of system processes in an environment where the characteristics of each process must be known to all other processes.

The Mixed Object Document Content Architecture (MO:DCA) is designed to integrate the different data object types into documents that can be interchanged as a single data stream. The Mixed Object Document Content Architecture (MO:DCA) provides the data stream structures need to carry the data objects. The data stream also provides syntactic and semantic rules governing the use of those objects to ensure that different applications process those objects in a consistent manner.

In its most complex form, a Mixed Object Document Content Architecture (MO:DCA) contains data objects along with data structures which define the document's layout and composition features. This form is called a Mixed Object Document Content Architecture (MO:DCA) presentation document. Within such a data stream the Mixed Object Document Content Architecture (MO:DCA) components are defined with a syntax that consists of self-describing structures. Structured fields are the main Mixed Object Document Content Architecture (MO:DCA) structures and are utilized to encode Mixed Object Document Content Architecture (MO:DCA) commands. A structured field typically starts with an introducer that uniquely identifies the command, provides a total length for the command, and specifies additional control information such as whether padding bytes are present. The introducer is then followed by up to 32,759 data bytes. Data may be encoded within the structured field utilizing fixed parameters, repeating groups, key words and triplets. Fixed parameters have a meaning only in the context of the structure that includes them. Repeating groups are utilized to specify grouping of parameters that can appear multiple times. Key words are self-identifying parameters that consist of a one byte unique key word identifier followed by a one byte keyword value. Triplets are self-identifying parameters that contain a one byte length, a one byte unique triplet identifier and up to 252 data bytes. Key words and triplets have the same semantics whenever they are utilized. Together these structures define a syntax for Mixed Object Document Content Architecture (MO:DCA) data streams which provide for orderly parsing and flexible extendibility.

The document is the highest level within the Mixed Object Document Content Architecture (MO:DCA) data stream document component hierarchy. Documents may be constructed of pages, and the pages, which are at the intermediate level, may be made up of objects. Objects are at the lowest level and can be bar codes, graphics, images and presentation text.

A Mixed Object Document Content Architecture (MO:DCA) document in its presentation form is a document which has been formatted and is intended for presentation, usually on a printer or a display device. A data stream containing a presentation document should produce the same document content in the same format on different printers or display devices dependent, however, on the capabilities of each of the printers or display devices. A presentation document can reference resources that are to be included as part of the document to be presented which are not present within the data stream.

Pages within the Mixed Object Document Content Architecture (MO:DCA) are the level within the document component hierarchy which is utilized to printing or displaying a document's content. Data objects contained within each page envelope in the data stream are presented when the page is presented. Each data object has layout information associated with it that directs the placement and orientation of the data on the page. In addition, each page contains layout information and specifies the measurement units, page width and page depth.

Data objects within the Mixed Object Document Content Architecture (MO:DCA) contain the data which is to be presented. Such objects may also contain environment information needed to establish the proper location and orientation for the data on the presentation surface. Objects in the data stream are bounded by delimiters that identify the object type, such as graphics, image or text. The Mixed Object Document Content Architecture (MO:DCA) supports two categories of objects: data objects, and resource objects. In general data objects consist of data to be presented and the directives required to present it. The content of each type of data object is defined by an object architecture that specifies presentation functions which may be utilized within its coordinate space. All data objects function as equals within the Mixed Object Document Content Architecture (MO:DCA) data stream environment. Data objects are carried as separate entities with no dependencies on the Mixed Object Document Content Architecture (MO:DCA) layout structures or the containing data stream environment. Resource objects are named objects or named collection of objects that can be referenced from within the document. In general, referenced resources can reside in a resource group that precedes the document or in an external resource library and can be referenced over and over. Such objects may need to be utilized in numerous places within a document or within several documents. They are characterized by an unchanging and often complex composition. It is therefore inefficient and thus undesirable for applications to generate these objects each time they are required. Instead, the inclusion of these objects in a library enables applications to retrieve those objects as they are needed to obtain the desired presentation effect.

An object container within the Mixed Object Document Content Architecture (MO:DCA) is an envelope for object data that may not be defined by an International Business Machines Corporation presentation architecture and that may not define all required prosecution parameters. The container consists of a mandatory Begin/End structured field pair, an optional Object Environment Group (OEG) and optional Object Container Data (OCD) structured fields. If an object is to be carried in Mixed Object Document Content Architecture (MO:DCA) resource groups and interchanged, it must, at a minimum, be enveloped by a Begin/End pair, and the Object Classification triplet on the Begin structured field must specify the registered object identifier (OID) for the object data format.

As should thus be apparent, data objects which are included within a page or overlay within a final form document are generally specified by including the complete object directly within the data stream or by referencing the object and including presentation parameters such as object area size, orientation, mapping and offset which are specified in association with the object and utilized to present the object. Any change to a presentation parameter requires a new object to be constructed, such that if multiple diverse applications wish to present the object in multiple diverse ways, multiple versions of the same object must be constructed and maintained. It would therefore be useful for a method and system to be provided which permits an object within a presentation data stream to have its presentation parameters dynamically modified so that multiple diverse versions of the object need not be maintained.

SUMMARY OF THE INVENTION

It is therefore one object of the present invention to provide an improved method for the management of a presentation data stream.

It is another object of the present invention to provide an improved method and system for adapting a presentation data stream for utilization within multiple diverse applications.

It is yet another object of the present invention to provide an improved method and system for dynamically overwriting existing presentation parameters for data objects within a presentation data stream.

It is still another object of the present invention to provide an improved method and system for dynamically providing presentation parameters for data objects not supported within the data stream architecture.

The foregoing objects are achieved as is now described. A method and system are disclosed for flexibly managing a presentation data stream which includes an ordered stream of uniquely identified data objects and associated elements which specify format and presentation parameters for those data objects for utilization within a specified application. An include object structured field is provided within the data stream which identifies a particular data object and specifies alternate presentation parameters for utilization with that data object. Thereafter, the data object referenced within the include object structured field can be presented utilizing the alternate presentation parameters, which override the presentation parameters associated with the referenced data object, obviating any requirement for providing alternate versions of that object for each of multiple diverse applications. In this manner multiple versions of a single data object may be presented utilizing multiple applications or data objects of different architectures may be referenced in an open system and dynamically included in a presentation form document by dynamically providing presentation parameters within the include object structural field.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is a tabular representation of the syntax of an include object structured field utilized in accordance with the method and system of the present invention;

DETAILED DESCRIPTION OF PREFERRED EMBODIMENT

Figure 1:
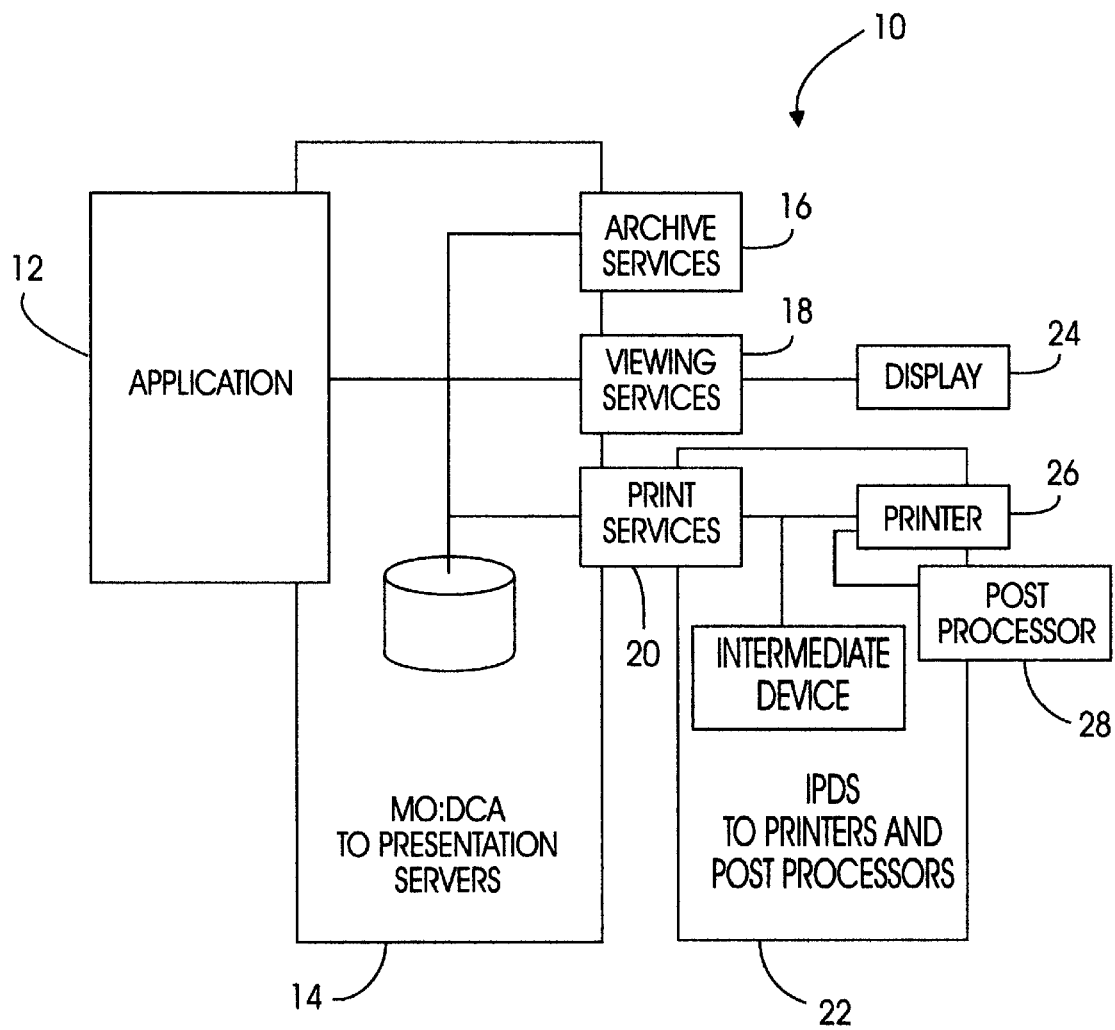
FIG. 1 depicts a pictorial representation of a system model relating Mixed Object Document Content Architecture (MO:DCA) and printer data streams to a presentation environment.

With reference now to the figures and in particular with reference to FIG. 1, there is depicted a pictorial representation of a system model relating Mixed Object Document Content Architecture (MO:DCA) and printer data streams to a presentation environment. As illustrated, a system 10 is depicted in which an application 12 can generate a data stream which is destined for a presentation service 20, an archive service 16 or a viewing service 18. The so-called "Intelligent Printer Data Stream (IPDS)" architecture may be utilized to further modify and define the data stream for utilization by print server programs and device drivers to manage an all-points-addressable page printing on a full spectrum of devices from low-end workstations and local area network-attached printers to high speed, high volume page printers for production jobs, shared printing and mail room applications. Thus, printer 26 and post processor 28 may utilize a data stream in the IPDS format.

Referring now to FIG. 2 there is depicted a tabular representation of the syntax of an include object structured field utilized in accordance with the method and system of the present invention. As depicted at reference numeral 30, the include object structured field includes a structured field introducer which specifies the structured field length, the identity of the structured field, any flags or bits which may identify whether or not the structured field is segmented or if a structured field extender or padding is to be utilized, a two byte field sequence number utilized to enable users to identify structured field sequences and the structured field data which provides the structured field's effect. The syntax for the include object structured field is shown at reference numeral 32. As depicted, the syntax includes an offset value in bytes and the type of field. A name for the particular field is provided, if applicable and the appropriate range of valid values for that field are also specified. The meaning or purpose of the data element is set forth under the column "meaning." Finally, an indication of whether or not the field is mandatory or optional and whether or not an exception code for the exception conditions which are possible for this data element is also provided.

Thus, as illustrated within FIG. 2, the include object structured field includes the object name "ObjName" which specifies the name of a particular object which may be present within the data steam or, in the case of a resource object or the like may be present within a library or other location in association with the data stream.

Next, an object type (ObjType) is present which specifies whether the object is an image, graphics, bar code, page segment or non-MOD:CA type object. X and Y axis offsets and orientations are also provided within the include object structured field and specify the X and Y axis origin and X and Y axis rotation from the reference coordinate system.

XocaOset and YocaOset values are also set forth to specify X axis origin for object content in position and position and trim mappings.

The value for this parameter is expressed in terms of the number of object area coordinate system X and Y axis measurement units. A reference coordinate system value (RefcSys) is also provided which specifies the coordinate system which is utilized to position the object area. Finally, various types of triplets may also be present within the include object structured field and may be utilized to characterize and identify data object classification, area measurement units, graphic character set identifiers, color specifications, presentations space mixing and rules for presentation space mixing as well as a replacement qualified name to be utilized as the name of the specified data object.

Upon reference to the foregoing those skilled in the art will appreciate that the include object structured field set forth herein may be utilized to specify a particular data object within a data stream or within a resource which may be accessed by the data stream and may be utilized to specify various presentation parameters which will then automatically override the presentation parameters normally associated with that object. In this manner multiple diverse applications for a particular object may be supported without a requirement for supporting multiple versions of the selected object.

Figure 3:
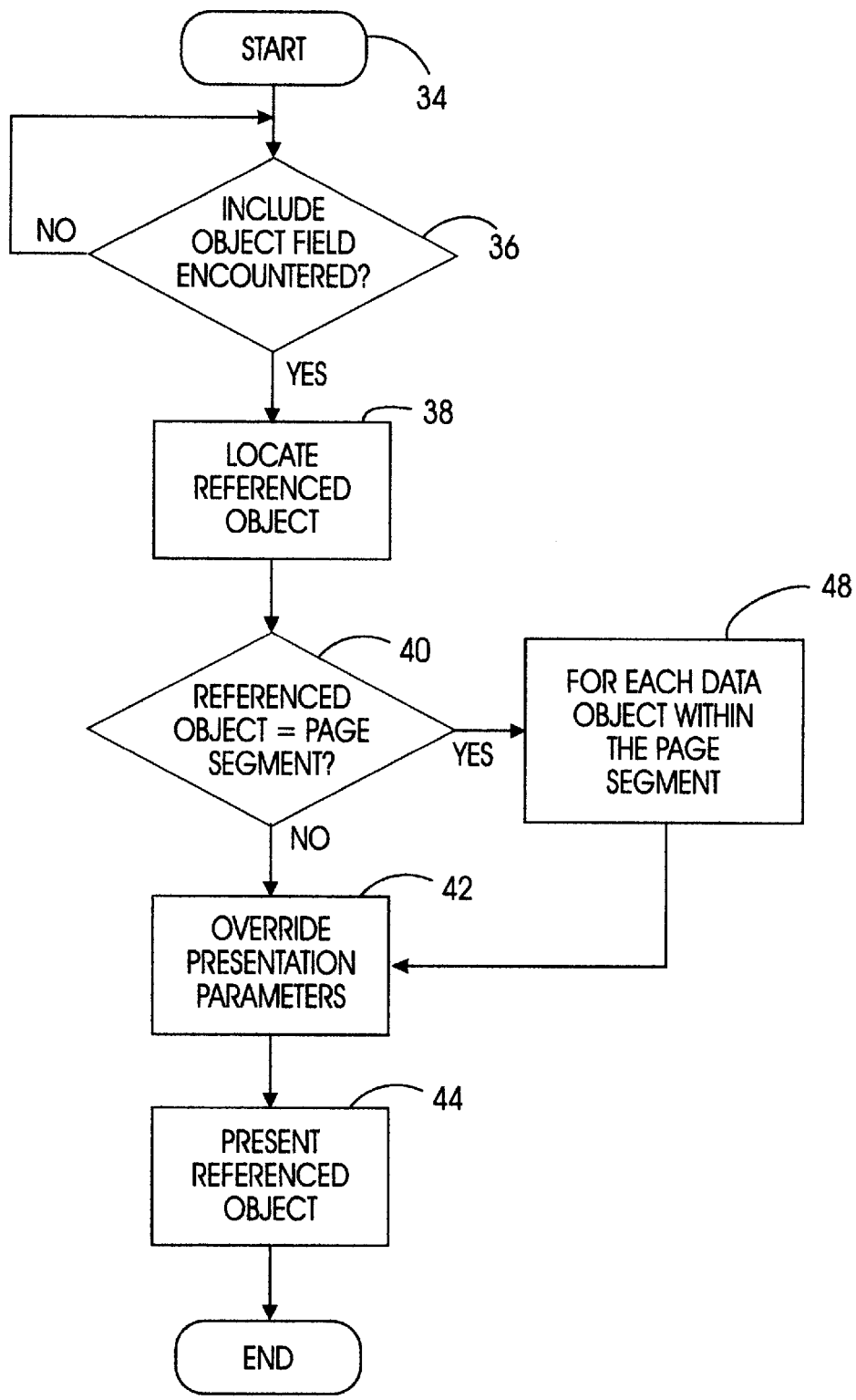
FIG. 3 is a high level logic flowchart illustrating a process for implementing the method of the present invention within a data processing system.

With reference now to FIG. 3 there is depicted a high level logic flowchart which illustrates a process for implementing the method of the present invention within a data processing system. As illustrated, this process begins at block 34 and thereafter passes to block 36. Block 36 illustrates a determination of whether or not an include object structured field has been encountered. If not, the process merely iterates until such time as an include object structured field is encountered.

Still referring to block 36, in the event an include object structured field is encountered the process passes to block 38. Block 38 illustrates the location of the referenced object and the process then passes to block 40. Block 40 illustrates a determination of whether or not the referenced object is a page segment. If the referenced object is not a page segment, the process passes to block 42 which depicts the overriding of the presentation parameters normally associated with the referenced object and the presentation of the referenced object utilizing the presentation parameters set forth within the include object structured field, as depicted at block 44. The process then passes to block 46 and returns.

Referring again to block 40, in the event the referenced object is a page segment, the process passes to block 48. Block 48 illustrates that the overriding of the presentation parameters and the presentation of the object will be accomplished for each data object within the referenced page segment. The process then passes to block 42 in the manner described above.

Figure 4:
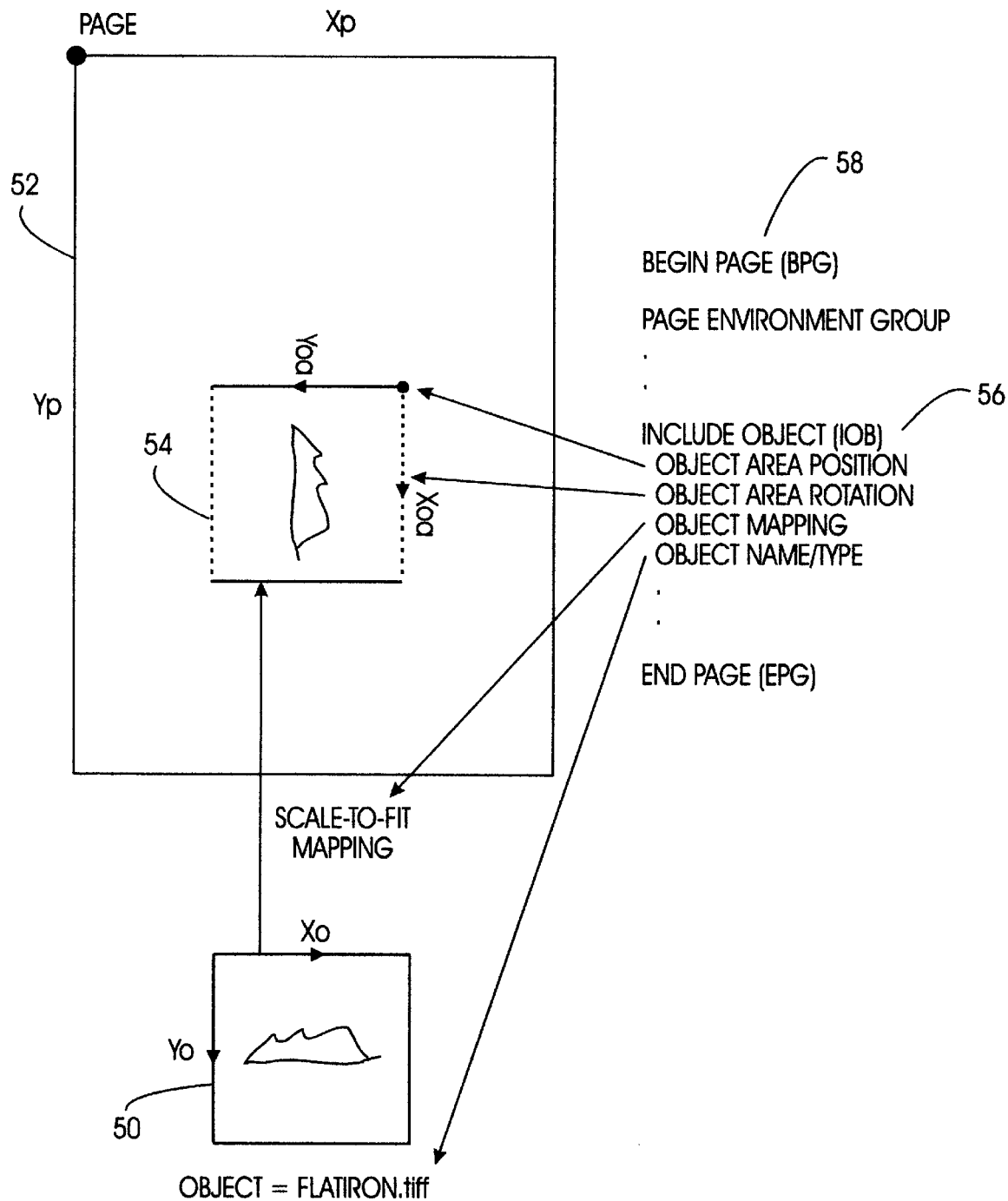
FIG. 4 is a graphic illustration of the mapping of a data object into an object area of a page utilizing the method and system of the present invention.

Finally, referring to FIG. 4, there is depicted a graphic illustration of the mapping of a data object into an object area of a page utilizing the method and system of the present invention. As illustrated, a graphic object "flatiron.tiff" 50 is illustrated. That object is referenced utilizing the method and system of the present invention and presented within page 52 in the manner depicted at reference numeral 54 utilizing the novel include object structured field of the present invention. As illustrated, an include object structured field 56 is shown in tabular fashion within a portion of data stream 58. The include object structured field 56 includes overriding presentation parameters for object area position, object area rotation, object mapping and the object name type which permit graphic object 50 to be presented in a diverse manner within page 52, as illustrated at reference numeral 54. In this manner, a diverse presentation of this object can be simply and efficiently accomplished without requiring graphic object 50 to be replicated utilizing alternate presentation parameters.

Upon reference to the foregoing those skilled in the art will appreciate that by providing the include object structured field of the present invention a single object having associated therewith standard presentation parameters may be utilized in a variety of applications without requiring the system to maintain a separate set of presentation parameters in association with that object.

While the invention has been particularly shown and described with reference to a preferred embodiment, it will be understood by those skilled in the art that various changes in form and detail may be made therein without departing from the spirit and scope of the invention.

We claim:

1. A method of flexibly managing a presentation data stream comprising a continuous ordered stream of uniquely identified data objects and associated elements which specify display format and display presentation parameters for each of those data objects for utilization within a specified application, said method comprising the steps of:
    defining an include object structured field within the presentation data stream;
    identifying a particular data object within said include object structured field;
    specifying alternate display presentation parameters for said particular object within said include object structured field wherein at least one of said alternate display presentation parameters was not previously present within said presentation data stream; and
    thereafter, processing said particular data object in accordance with said alternate presentation parameters within said include object structured field without regard to said elements associated with said particular data object wherein said particular data object may be utilized within multiple diverse applications.

2. The method of flexibly managing a presentation data stream according to claim 1, wherein said particular data object is present within said presentation data stream.

3. The method of flexibly managing a presentation data stream according to claim 1, wherein said step of specifying alternate presentation parameters for said particular data object within said include object structured field comprises the step of specifying an alternate object area offset for said particular data object within said include object structured field.

4. The method of flexibly managing a presentation data stream according to claim 1, wherein said step of specifying an alternate presentation parameters for said particular data object within said include object structured field comprises the step of specifying an alternate object area size for said particular data object within said include object structured field.

5. The method of flexibly managing a presentation data stream according to claim 1, wherein said step of specifying an alternate presentation parameters for said particular data object within said include object structured field comprises the step of specifying an alternate object area orientation for said particular data object within said include object structured field.

6. The method of flexibly managing a presentation data stream according to claim 1, wherein said step of specifying an alternate presentation parameters for said particular data object within said include object structured field comprises the step of specifying an alternate color for presentation of said particular object within said include object structured field.

7. The method of flexibly managing a presentation data stream according to claim 1, wherein said step of specifying an alternate presentation parameters for said particular data object within said include object structured field comprises the step of specifying an alternate mapping option for presentation of said particular object within said include object structured field.

8. The method of flexibly managing a presentation data stream according to claim 1, wherein said step of specifying an alternate presentation parameters for said particular data object within said include object structured field comprises the step of specifying alternate mixing rules for presentation of said particular object within said include object structured field.

9. The method of flexibly managing a presentation data stream according to claim 1, wherein said uniquely identified data objects include multiple diverse types of data objects and further including the step of specifying within said include object structured field a type of object for said particular data object.

10. A system for flexibly managing a presentation data stream comprising a continuous ordered stream of uniquely identified data objects and associated elements which specify display format and display presentation parameters for each of those data objects for utilization within a specified application, said system comprising:
    means for defining an include object structured field within the presentation data stream;
    means for identifying a particular data object within said include object structured field;
    means for specifying alternate display presentation parameters for said particular object within said include object structured field; and
    means for thereafter, processing said particular data object in accordance with said alternate presentation parameters within said include object structured field wherein at least one of said alternate display presentation parameters was not previously present within said presentation data stream without regard to said elements associated with said particular data object wherein said particular data object may be utilized within multiple diverse applications.

11. The system for flexibly managing a presentation data stream according to claim 10, wherein said particular data object is present within said presentation data stream.

12. A system for flexibly managing a presentation data stream according to claim 10, wherein said means for specifying an alternate presentation parameters for said particular data object within said include object structured field comprises the step of specifying an alternate object area offset for said particular data object within said include object structured field.

13. A system for flexibly managing a presentation data stream according to claim 10, wherein said means for specifying an alternate presentation parameters for said particular data object within said include object structured field comprises the means for specifying an alternate object area size for said particular data object within said include object structured field.

14. A system for flexibly managing a presentation data stream according to claim 10, wherein said means for specifying an alternate presentation parameters for said particular data object within said include object structured field comprises the means for specifying an alternate object area orientation for said particular data object within said include object structured field.

15. A system for flexibly managing a presentation data stream according to claim 10, wherein said means for specifying an alternate presentation parameters for said particular data object within said include object structured field comprises the means for specifying an alternate color for presentation of said particular within said include object structured field.

16. A system for flexibly managing a presentation data stream according to claim 10, wherein said means for specifying an alternate presentation parameters for said particular data object within said include object structured field comprises the means for specifying an alternate mapping option for presentation of said particular object within said include object structured field.

17. A system for flexibly managing a presentation data stream according to claim 10, wherein said means for specifying an alternate presentation parameters for said particular data object within said include object structured field comprises the means for specifying alternate mixing rules for presentation of said particular object within said include object structured field.

18. A system for flexibly managing a presentation data stream according to claim 10, wherein said uniquely identified data objects include multiple diverse types of data objects and further including the means for specifying within said include object structured field a type of object for said particular data object.

19. A computer program product for flexibly managing a presentation data stream comprising a continuous ordered stream of uniquely identified data objects and associated elements which specify display format and display presentation parameters for each of those data objects for utilization within a specified application, said computer program product stored within a storage media and adapted to be utilized within a data processing system, said computer program product comprising:

instruction means within said storage media for defining an include object structured field within the presentation data stream;

an instruction means within said storage media for identifying a particular instruction means within said storage media for specifying alternate display presentation identifying a particular data object within said include object structured field; and instruction means stored within said storage media for thereafter processing said particular data object in accordance with said alternate presentation parameters within said include object structured field wherein at least one of said alternate display presentation parameters was not previously present within said presentation data stream without regard to said elements associated with said particular data object wherein said particular data object may be utilized within multiple diverse applications.

* * * * *